(12) United States Patent
Palomares Mora

(10) Patent No.: US 10,399,693 B2
(45) Date of Patent: Sep. 3, 2019

(54) AIRCRAFT WITH AN AUXILIARY POWER UNIT ATTACHED TO THE AIRCRAFT FUSELAGE BY MEANS OF AN ATTACHMENT SYSTEM

(71) Applicant: Airbus Operations, S.L., Getafe (ES)

(72) Inventor: Angel Palomares Mora, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 499 days.

(21) Appl. No.: 15/180,295

(22) Filed: Jun. 13, 2016

(65) Prior Publication Data

US 2016/0362189 A1 Dec. 15, 2016

(30) Foreign Application Priority Data

Jun. 12, 2015 (EP) .................................... 15382309

(51) Int. Cl.
*B64D 41/00* (2006.01)
*B64D 27/26* (2006.01)

(52) U.S. Cl.
CPC ........ *B64D 41/00* (2013.01); *B64D 2027/266* (2013.01); *B64D 2041/002* (2013.01); *Y02T 50/44* (2013.01)

(58) Field of Classification Search
CPC .. B64D 41/00; B64D 2041/002; B64D 27/26; B64D 2027/266; B64C 27/001; B64C 2027/002
See application file for complete search history.

(56) References Cited

U.S. PATENT DOCUMENTS

| 2,457,425 | A | | 12/1948 | Wolfard | |
|---|---|---|---|---|---|
| 4,097,011 | A | * | 6/1978 | White | B64D 27/26 248/557 |
| 5,523,530 | A | * | 6/1996 | Byrnes | B64C 27/001 181/208 |
| 6,328,293 | B1 | * | 12/2001 | Olsen | B64D 27/26 244/54 |

(Continued)

FOREIGN PATENT DOCUMENTS

| GB | 1223100 A | * | 2/1971 | .......... F04D 29/605 |
|---|---|---|---|---|
| WO | 2006108028 | | 10/2006 | |
| WO | 2009132846 | | 11/2009 | |

OTHER PUBLICATIONS

European Search Report, dated Nov. 20, 2015, priority document.

*Primary Examiner* — Richard R. Green
(74) *Attorney, Agent, or Firm* — Greer, Burns & Crain, Ltd.

(57) ABSTRACT

An aircraft with an auxiliary power unit attached to the aircraft fuselage via an attachment system. The auxiliary power unit is placed inside the aircraft fuselage structure. The attachment system comprises a plurality of structural wires that link the auxiliary power unit to the aircraft fuselage structure. An attachment device is located at the end of each structural wire to connect the structural wire to the aircraft fuselage structure. Each attachment device comprises a metallic plate adjacent to the aircraft fuselage structure and a layer of damping elastomeric material adjacent to the metallic plate. The metallic plate is placed between the layer of damping elastomeric material and the aircraft fuselage structure. The attachment device is joined to the aircraft fuselage structure by attachment fasteners.

7 Claims, 4 Drawing Sheets

(56) References Cited

U.S. PATENT DOCUMENTS

| | | | | |
|---|---|---|---|---|
| 6,581,874 B2 * | 6/2003 | Lemire | ................ | B64D 41/00 244/54 |
| 7,891,626 B2 * | 2/2011 | Lindberg | ............. | B25H 1/0007 248/340 |
| 9,469,412 B2 * | 10/2016 | Nager | ................... | B64D 41/00 |
| 2006/0273221 A1 | 12/2006 | Olsen et al. | | |
| 2011/0049291 A1 | 3/2011 | Piezunka | | |

* cited by examiner

AIRCRAFT WITH AN AUXILIARY POWER UNIT ATTACHED TO THE AIRCRAFT FUSELAGE BY MEANS OF AN ATTACHMENT SYSTEM

CROSS-REFERENCES TO RELATED APPLICATIONS

This application claims the benefit of the European patent application No. 15382309.1 filed on Jun. 12, 2015, the entire disclosures of which are incorporated herein by way of reference.

FIELD OF THE INVENTION

The present invention relates to an aircraft with an auxiliary power unit (APU) attached to the aircraft fuselage by means of an attachment system.

BACKGROUND OF THE INVENTION

The Auxiliary Power Unit (APU) provides auxiliary power (pneumatic and electric) to the various systems in an aircraft and Main Engine Start.

The APU is conventionally suspended by several rigid linkages that attach it to the fuselage, generally in the tailcone structure.

The APU suspension system ensures that all the rigid body degrees of freedom of the system are removed while allowing relative motion to absorb the thermal expansion of the APU and manufacturing and assembly tolerances. Additionally, it has the purpose of isolating the aircraft from the machine vibrations and vice-versa, for instance, isolating the APU from aerodynamic and inertia dynamic loads coming from the aircraft, by creating a spring damper system that avoids dynamic coupling between the APU and the aircraft and minimizes load amplifications at critical frequencies.

Known suspension systems comprise several rigid struts or suspension rods for attaching the APU to the tailcone structure. They also comprise vibration isolators attached to the end of the struts adjacent to the engine or auxiliary power unit for reducing the transmission of vibration and shocks from the APU to the aircraft structure and vice-versa. The vibration isolators comprise a housing in connection with the struts for enclosing an elastomeric element for absorbing the vibrations.

Furthermore, known suspension systems comprise APU attachment brackets for joining the vibration isolators to the APU. The struts are joined to an extension of the housing. Each vibration isolator and its corresponding APU attachment bracket is called a mount.

Finally, several structure attachment brackets are located at the end of the struts adjacent to the fuselage tailcone structure for joining the struts to the fuselage structure.

In this way the rigid struts suspension system links the APU to the fuselage structure rigidly, the struts absorbing tension, compression and, in some design concepts, shear loads.

One example of these systems is the one described in WO 2006/108028 A2, which relates to an aircraft auxiliary power unit suspension system for isolating an aircraft auxiliary power unit including at least one suspension linkage.

However, these systems lead to some problems relating to wearing, resonances and damage on fittings due to the load transmission. Besides that, the housing of the damper systems is usually heavy and not very efficient.

SUMMARY OF THE INVENTION

Therefore, an object of the invention is to provide an aircraft with an auxiliary power unit (APU) attached to the aircraft fuselage by means of an attachment system that solves the above-mentioned drawbacks.

The invention provides an aircraft with an auxiliary power unit attached to the aircraft fuselage by means of an attachment system, the auxiliary power unit being placed inside the aircraft fuselage structure, and the attachment system comprising:
  a plurality of structural wires that link the auxiliary power unit to the aircraft fuselage structure,
  an attachment device located at the end of each structural wire to connect the structural wire to the aircraft fuselage structure, each attachment device comprising:
    a metallic plate adjacent to the aircraft fuselage structure
    a layer of damping elastomeric material adjacent to the metallic plate, such that the metallic plate is placed between the layer of damping elastomeric material and the aircraft fuselage structure,
  the attachment device being joined to the aircraft fuselage structure by attachment fasteners.

With this configuration the load path is easier to control and, as the wires do not have to take compression or shear loads (they only work with tension loads), they are lighter, which results in weight reduction, a key parameter in aircraft design.

BRIEF DESCRIPTION OF THE DRAWINGS

For a more complete understanding of the present invention, it will be described below in greater detail, making reference to the attached drawings, in which.

DETAILED DESCRIPTION OF THE PREFERRED EMBODIMENTS

Figure 1:
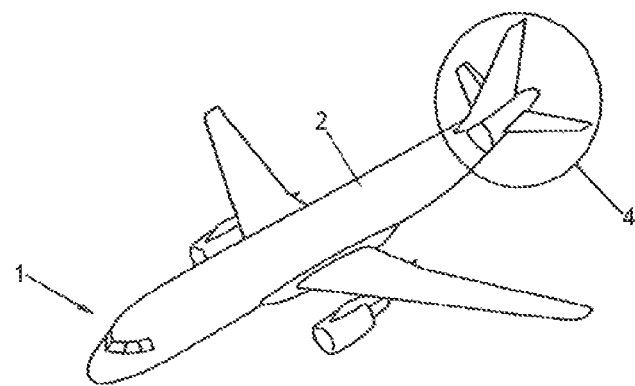
FIG. 1 is a perspective view of an aircraft of the invention.
Figure 2:
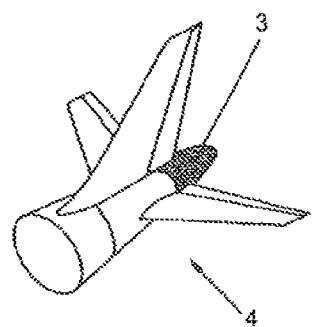
FIG. 2 is a view of the rear part of the fuselage of the aircraft of the invention, including its tailcone.

FIG. 1 shows an aircraft 1 of the invention with its aircraft fuselage 2, and FIG. 2 shows, more in detail, the rear part 4 of the aircraft 1 of FIG. 1, including the tailcone 3.

Figure 3:
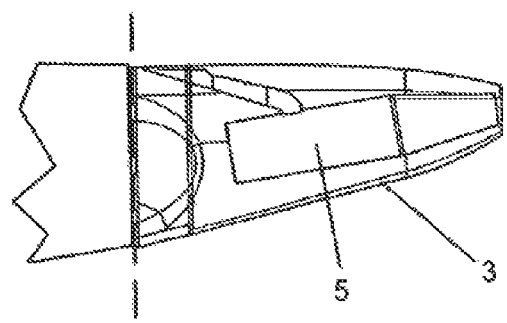
FIG. 3 is a cross-section view of the tailcone of the aircraft, showing an auxiliary power unit.
Figure 4:
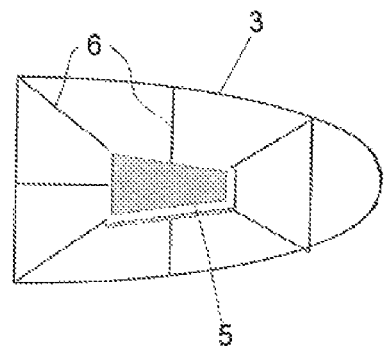
FIG. 4 is a schematic view of the tailcone of the aircraft and the auxiliary power unit, with an attachment system.

FIG. 3 shows the tailcone 3 of the aircraft 1 of FIGS. 1 and 2 connected to the rest of the aircraft fuselage 2 structure, with an auxiliary power unit 5 (APU) inside, and FIGS. 3 and 4 show the auxiliary power unit 5 attached to the aircraft fuselage 2 in the tailcone 3 of the fuselage 2.

FIG. 4 shows the attachment system that attaches the auxiliary power unit 5 to the aircraft fuselage 2 in a schematic way. The attachment system comprises a plurality of structural wires 6 that link the auxiliary power unit 5 to the aircraft fuselage 2 structure, as can be seen in FIG. 4. The system also comprises an attachment device 7 (represented in detail in FIGS. 5 and 6) located at the end of each structural wire to connect the structural wire to the aircraft fuselage 2 structure. Each attachment device 7 of FIGS. 5 and 6 comprises:

a metallic plate 8 adjacent to the aircraft fuselage 2 structure, a layer 9 of damping elastomeric material adjacent to the metallic plate 8, such that the metallic plate 8 is placed between the layer 9 of damping elastomeric material and the aircraft fuselage 2 structure.

Figure 5:
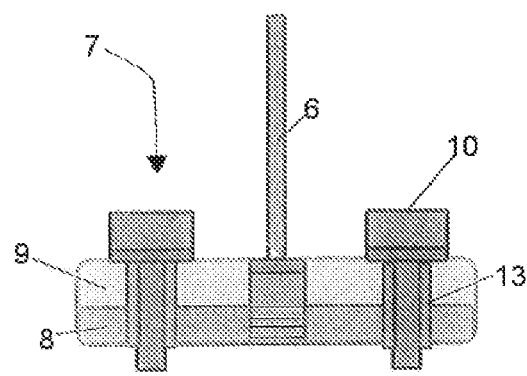
FIG. 5 is a schematic view of an attachment device of the attachment system.
Figure 6:
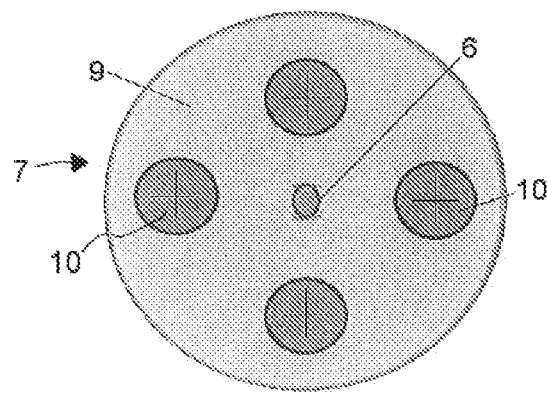
FIG. 6 is a schematic plan view of the attachment device of FIG. 5.

FIGS. 5 and 6 also show that the attachment device 7 is joined to the aircraft fuselage 2 structure by an attachment fastener 10.

The attachment system that attaches the wires 6 to the aircraft fuselage 2 structure must be able to absorb the vibrations transmitted from the APU to the fuselage 2 structure due to the operation of the engine or by inertial displacements of the machine.

As for the structural wires 6 that link the auxiliary power unit 5 to the aircraft fuselage 2 structure, they can be metallic wires, which are the most common ones that can be found in the market.

Figure 7:
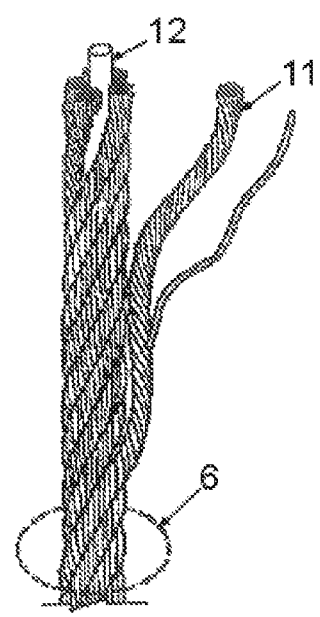
FIG. 7 is a view of the configuration of a structural wire of the attachment system.

The structural wires 6 of the system can be built as a helicoidal twister composed by several threads 11 around a central metallic or fiber strand 12 (see FIG. 7).

For assembly installation purposes, a longitudinal stripe could be painted along the entire length of the strand or wire rope while it is under the prescribed measuring tension. Striping allows structural strand or wire rope assemblies to be installed in the proper orientation. If the stripe is straight after an assembly is erected, its length, when loaded to the measuring tension, will be the same as measured during fabrication.

Galvanized (zinc-coated) wire is usually used in rope/ strand to combat the corrosive environments of salt water, atmospheric contaminants, and humid and moist conditions. The combination of strand and wire rope physical properties and zinc coating has been successfully used in many applications.

Attaching sockets correctly is of prime importance because the connection must be as strong as the strand or wire rope. But also, the attachment must be able to absorb the vibrations transmitted from the APU to the structure due to the operation of the engine or by inertial displacements of the machine.

Current suspension systems are composed by eight metallic struts and four isolators to damp the transmission from APU loads to the structure. The weight of these systems is around 15 Kg.

An equivalent design concept based on wires 6 can be composed by 16 wires 6 of ½ inch diameter and around an average length of 1 meter (3 ft).

In this way, the total weight of the wires 6 would be around=16*3*0.24=11.52 lb=5.184 Kg. Adding the sockets weight, the total weight of the new system concept could be around 10 Kg, so there is an important weight reduction.

According to an embodiment of the invention, there are 16 structural wires 6 that link the auxiliary power unit 5 to the aircraft fuselage 2 structure, As for the attachment fasteners 10 that join the attachment device 7 to the aircraft fuselage 2 structure, they may comprise bolts that extend across the metallic plate 8 and the layer 9 of damping elastomeric material. As shown in FIG. 5, the portion of the bolts that crosses the metallic plate 8 and the layer 9 of damping elastomeric material is surrounded by bearings 13 in the represented embodiment.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft with an auxiliary power unit attached to an aircraft fuselage via an attachment system, the auxiliary power unit being placed inside an aircraft fuselage structure, the attachment system comprising:
    a plurality of structural wires linking the auxiliary power unit to the aircraft fuselage structure,
    an attachment device located at the end of each structural wire to connect the structural wire to the aircraft fuselage structure, each attachment device comprising:
    a metallic plate adjacent to the aircraft fuselage structure,
    a layer of damping elastomeric material adjacent to the metallic plate, such that the metallic plate is placed between the layer of damping elastomeric material and the aircraft fuselage structure,
    the attachment device being joined to the aircraft fuselage structure by attachment fasteners,
    wherein each of the plurality of wires is loaded in tension providing a primary attachment system for the auxiliary power unit.

2. The aircraft according to claim 1, wherein the structural wires are metallic.

3. The aircraft according to claim 2, wherein the structural wires are galvanized.

4. The aircraft according to claim 1, wherein the structural wires comprise several threads around a central metallic or fiber strand.

5. The aircraft according to claim 1, wherein there are 16 structural wires that link the auxiliary power unit to the aircraft fuselage structure.

6. The aircraft according to claim 1, wherein the attachment fasteners comprise bolts that extend across the metallic plate and the layer of damping elastomeric material, the portion of the bolts that crosses the metallic plate and the layer of damping elastomeric material being surrounded by bearings.

7. The aircraft according to claim 1, wherein the auxiliary power unit is attached to the aircraft fuselage in a tailcone of the aircraft fuselage.

* * * * *